US012625758B2

(12) United States Patent
Suzuki

(10) Patent No.: US 12,625,758 B2
(45) Date of Patent: May 12, 2026

(54) VEHICLE CONTROL DEVICE

(71) Applicant: TOYOTA JIDOSHA KABUSHIKI KAISHA, Toyota (JP)

(72) Inventor: Kiyoto Suzuki, Tokoname (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/040,961

(22) Filed: Jan. 30, 2025

(65) Prior Publication Data

US 2025/0315338 A1     Oct. 9, 2025

(30) Foreign Application Priority Data

Apr. 5, 2024     (JP) .................................. 2024-061706

(51) Int. Cl.
*G06F 11/07*          (2006.01)
*H04L 12/40*          (2006.01)
(52) U.S. Cl.
CPC ........ *G06F 11/079* (2013.01); *G06F 11/0721* (2013.01); *H04L 2012/40215* (2013.01)
(58) Field of Classification Search
CPC ............. G06F 11/0721; G06F 11/0739; G06F 11/079; G05B 19/058; G05B 2219/1103; G05B 2219/14006; G05B 2219/24065; G05B 23/00; H04L 2012/40215
See application file for complete search history.

(56) References Cited

U.S. PATENT DOCUMENTS

| | | | |
|---|---|---|---|
| 9,251,632 B2 * | 2/2016 | Saito .................... | G07C 5/0808 |
| 2016/0076976 A1 | 3/2016 | Patrick et al. | |
| 2021/0126928 A1 * | 4/2021 | Jones .................... | G05B 21/02 |
| 2022/0255994 A1 * | 8/2022 | Nishikawa ............ | G06F 13/385 |

FOREIGN PATENT DOCUMENTS

JP          2016-061293 A     4/2016

* cited by examiner

*Primary Examiner* — Michael Maskulinski
(74) *Attorney, Agent, or Firm* — SoraIP, Inc.

(57)                    ABSTRACT

The vehicle ECU is a vehicle control device including a CPU and a CAN controller, wherein CPU transmits an instruction to execute a failure diagnosis to CAN controller, and CAN controller includes a diagnosis buffer storing data relating to a failure diagnosis request for the diagnosis target and data relating to a response from the diagnosis target, and a sequencer. The sequencer is configured to read data from the diagnosis buffers in response to reception of the execution instruction, transmit a failure diagnosis request to the diagnosis target ECU, receive a response transmitted from the diagnosis target ECU, perform diagnosis based on the response, and transmit the diagnosis result to CPU.

3 Claims, 3 Drawing Sheets

FIG. 2

| | REQUEST/<br>RESPONSE | COMMAND/<br>EXPECTED VALUE | WAIT TIME |
|---|---|---|---|
| FIRST | REQUEST | COMMAND | Nc |
| SECOND | RESPONSE | EXPECTED VALUE | Nc |
| THIRD | REQUEST | COMMAND | Nc |
| FOURTH | RESPONSE | EXPECTED VALUE | Nc |
| FIFTH | REQUEST | COMMAND | Nc |
| . . . | . . . | . . . | . . . |
| N-1 TIME | RESPONSE | EXPECTED VALUE | Nc |
| NTH | NULL | NULL | NULL |

FIG. 3

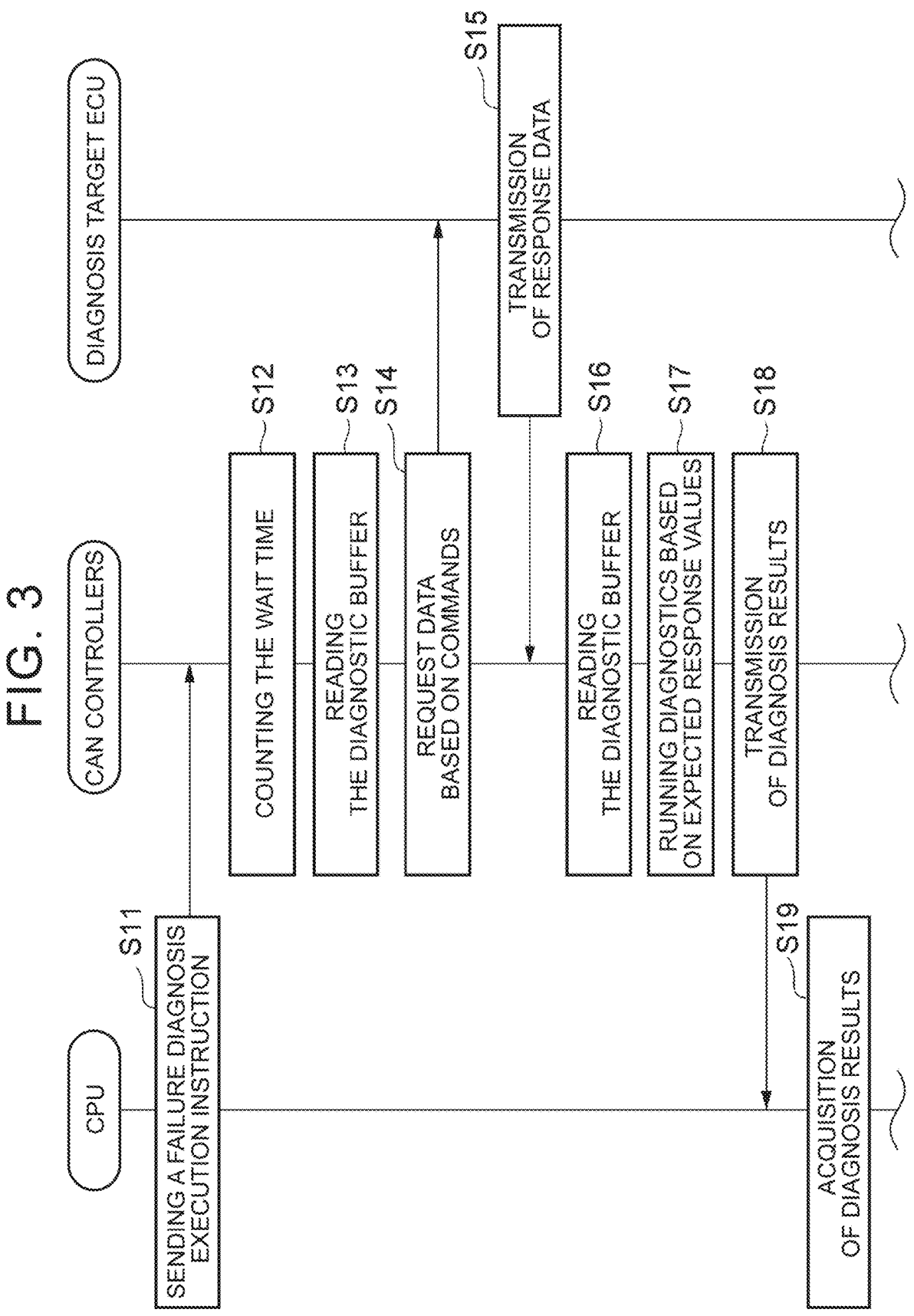

DIAGNOSIS TARGET ECU

CAN CONTROLLERS

CPU

S11 — SENDING A FAILURE DIAGNOSIS EXECUTION INSTRUCTION

S12 — COUNTING THE WAIT TIME

S13 — READING THE DIAGNOSTIC BUFFER

S14 — REQUEST DATA BASED ON COMMANDS

S15 — TRANSMISSION OF RESPONSE DATA

S16 — READING THE DIAGNOSTIC BUFFER

S17 — RUNNING DIAGNOSTICS BASED ON EXPECTED RESPONSE VALUES

S18 — TRANSMISSION OF DIAGNOSIS RESULTS

S19 — ACQUISITION OF DIAGNOSIS RESULTS

VEHICLE CONTROL DEVICE

CROSS-REFERENCE TO RELATED APPLICATION

This application claims priority to Japanese Patent Application No. 2024-061706 filed on Apr. 5, 2024, incorporated herein by reference in its entirety.

BACKGROUND

1. Technical Field

The present disclosure relates to a vehicle control device.

2. Description of Related Art

For example, Japanese Unexamined Patent Application Publication No. 2016-061293 (JP 2016-061293 A) describes a device including a processor that processes input information and generates a failure prediction report for one or more movable components.

SUMMARY

In the device as in the above related art, issuance of a diagnosis request for failure diagnosis and setting of a diagnosis response are executed by a CPU that executes processes based on codes etc. stored in a flash memory etc. In recent years, expansion of software to be processed by the CPU is required. The CPU processing load and the memory usage tend to increase. It is desired to reduce the burden on the CPU along with the failure diagnosis.

One aspect of the present disclosure is a vehicle control device including a central processing unit and a controller area network controller.

The central processing unit is configured to transmit an execution instruction for failure diagnosis to the controller area network controller.

The controller area network controller includes a storage unit configured to store data on a request for the failure diagnosis of a diagnosis target and data on a response from the diagnosis target, and a sequencer configured to operate in response to the execution instruction.

The sequencer is configured to read the data from the storage unit in response to reception of the execution instruction, transmit a request for the failure diagnosis to the diagnosis target, receive a response transmitted from the diagnosis target in response to the request for the failure diagnosis, execute diagnosis based on the received response, and transmit a result of the diagnosis to the central processing unit.

In the vehicle control device according to the aspect of the present disclosure, the central processing unit transmits the execution instruction for the failure diagnosis to the controller area network controller, and the controller area network controller executes the diagnosis based on the reception of the execution instruction and transmits the result of the diagnosis to the central processing unit. When the central processing unit transmits the execution instruction for the failure diagnosis, the central processing unit can acquire the result of the diagnosis without executing the diagnosis process. Therefore, as compared with a case where the central processing unit executes the diagnosis process, the processing load on the central processing unit and the memory usage can be reduced, and the burden on the central processing unit along with the failure diagnosis can be reduced.

In one embodiment, the storage unit may be configured to store the data on the request and the data on the response as a plurality of data frames, and the sequencer may be configured to, based on the data included in the data frames read from the storage unit, select whether to transmit the request for the failure diagnosis to the diagnosis target or to execute the diagnosis based on the response. In this case, the operation of the sequencer can be automatically switched when the sequencer sequentially reads the data frames.

In one embodiment, the sequencer may be configured to, when all the data included in the data frames has been read from the storage unit, transmit data indicating completion of reading to the central processing unit. In this case, the central processing unit can recognize that the series of diagnoses included in the data frames has been completed.

According to the present disclosure, the burden on the central processing unit along with the failure diagnosis can be reduced as compared with a case where the central processing unit executes the diagnosis process.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram illustrating an exemplary data frame; and

FIG. 3 is a sequence diagram illustrating an example of a diagnosis process of a vehicle control device.

DETAILED DESCRIPTION OF EMBODIMENTS

Figure 1:
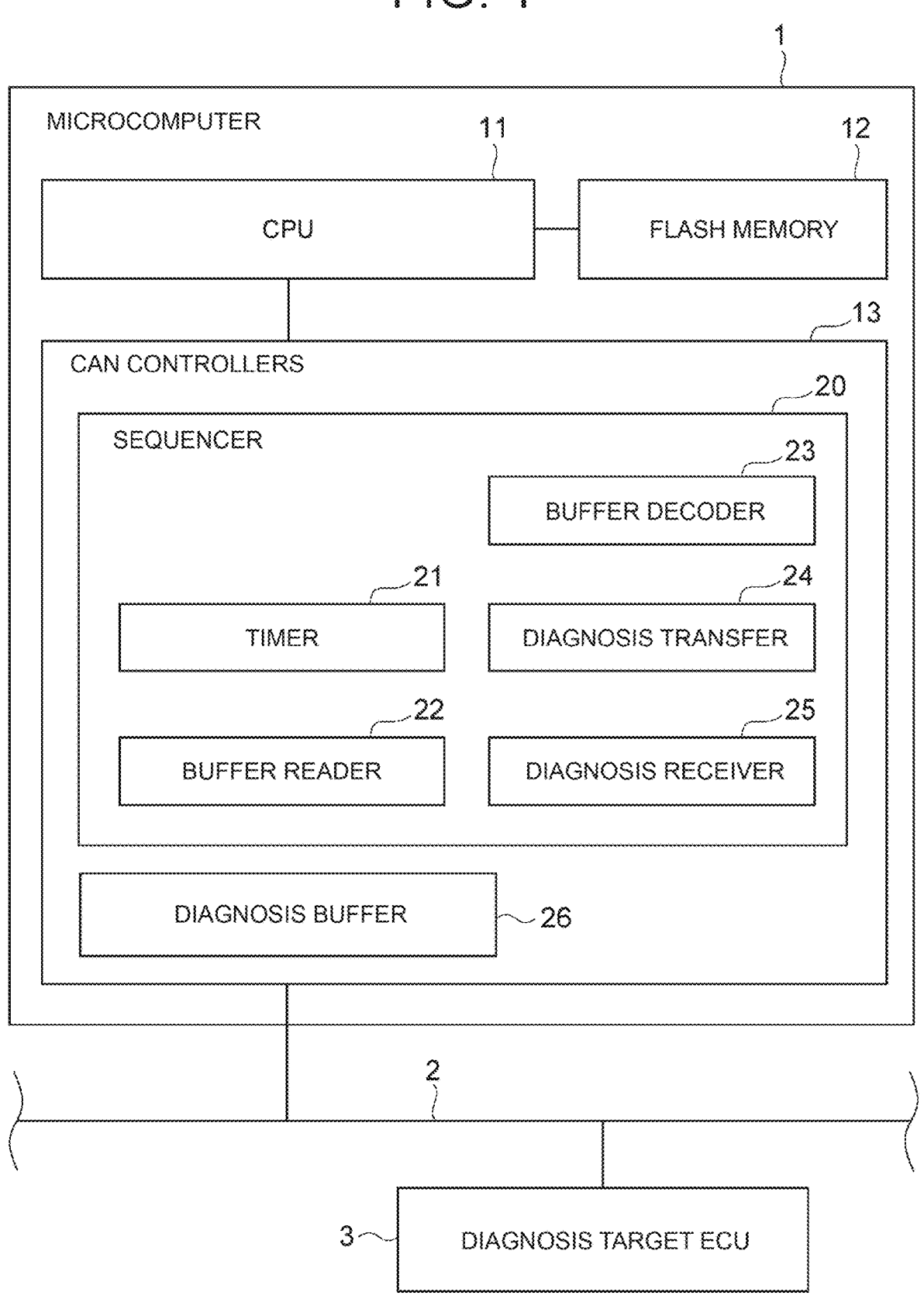
FIG. 1 is a block diagram illustrating an example of a configuration of a vehicle control device according to an embodiment.

Hereinafter, an embodiment of the disclosure will be described with reference to the drawings.

FIG. 1 is a block diagram illustrating an example of a configuration of a vehicle control device according to an embodiment. As shown in FIG. 1, the vehicle ECU [Electronic Control Unit] 1 (vehicle control device) of the present embodiment is an electronic control unit (microcomputer) mounted on a vehicle such as a passenger car. The vehicle ECU 1 is connected to various ECU such as a transmission, a ABS, a door, and an actuator via a CAN bus 2, and integrally controls the vehicle. CAN bus 2 is a network of CAN [Controller Area Network] communications in vehicles that perform data communications in accordance with a predetermined CAN of communication protocols.

The diagnosis target ECU 3 is an ECU that is a target of failure diagnosis of the vehicle ECU 1 among the various ECU. The vehicle ECU 1 may diagnose one diagnosis target ECU 3 or may sequentially diagnose a plurality of diagnosis target ECU 3.

The vehicle ECU 1 includes a flash memory 12 as a CPU 11 [Central Processing Unit], a ROM [Read Only Memory], a RAM [Random Access Memory], and the like. In the vehicle ECU 1, for example, various functions are realized by loading a program recorded in the flash memory 12 into a RAM and executing the program loaded in RAM with a CPU 11. The vehicle ECU 1 may be composed of a plurality of electronic units.

The vehicle ECU 1 includes CAN controller 13. CAN controller 13 is devices that provide an interface between ECU 1 and CAN bus 2. CAN controller 13 performs data communication based on commands from CPU 11 with other ECU such as diagnostic target ECU 3 in accordance with CAN communication protocols. CAN controller 13 has functions such as data-transmission/reception and error-detection. For example, CAN transceivers, CAN interface chips, and the like may be used in CAN controller 13. CPU 11 and CAN controller 13 are not particularly limited as long as they are within the same chip, for example, and can be signaled by interrupts or busses.

CAN controller 13 includes a sequencer 20 and diagnostic buffers (storage units) 26.

The sequencer 20 is a programmable logic controller [PLC: Programmable Logic Controller] that operates in response to various instructions from CPU 11. The sequencer 20 is suitable for a task requiring a real-time response. The sequencer 20 operates in response to an instruction to perform failure diagnostics from CPU 11. The functional configuration of the sequencer 20 will be described later.

The diagnosis buffer 26 is a memory area for storing data used for failure diagnosis. The diagnosis buffer 26 includes a non-volatile memory area. The diagnosis buffer 26 stores data related to a failure diagnosis request for a diagnosis target ECU 3 that is a diagnosis target, and data related to a response from the diagnosis target ECU 3. These data may be written, for example, from a factory facility at the time of manufacturing a vehicle or a vehicle ECU 1.

These data are data for automatically performing a plurality of failure diagnoses. For example, the diagnosis buffer 26 stores data related to a failure diagnosis request for the diagnosis target ECU 3 and data related to a response from the diagnosis target ECU 3 as a plurality of data frames.

FIG. 2 is a diagram illustrating an example of a data frame. As illustrated in FIG. 2, the diagnosis buffer 26 may store data related to a failure diagnosis request for the diagnosis target ECU 3 and data related to a response from the diagnosis target ECU 3 as a plurality of data frames corresponding to N−1 failure diagnoses. One data frame corresponds to one row of the table of FIG. 2. The data related to the failure diagnosis request may be CAN message data including ID corresponding to the type of diagnosis target ECU 3 and data for the failure diagnosis. The data relating to the response may be CAN message data including a ID corresponding to the type of diagnosis target ECU 3 and an expected value as the response. The expected value means a value of a response transmitted by the diagnosis target ECU 3 that has received the data for the failure diagnosis when the diagnosis target ECU 3 is normal.

In the example of FIG. 2, one data frame includes data specifying "failure diagnosis request or response", data specifying "command to send a request to a diagnosis target ECU 3 or expected value as a response", and wait times. Such data frames are preset for N−1 sets and are used for N−1 consecutive fault diagnostics. The last Nth data is "NULL" to indicate that N−1 failure diagnoses have been completed.

The sequencer 20 includes, as a functional configuration, a timer 21, a buffer reader 22, a buffer decoder 23, a diagnosis transfer 24, and a diagnosis receiver 25.

The timer 21 is clocked by counters generated by clocks provided in CAN controller 13. The timer 21 starts the operation, for example, when an instruction to perform fault diagnostics is received from CPU 11. The timer 21 operates in synchronization with clocks provided in CAN controller 13, and controls the data read timing and the like of the buffer reader 22. The timer 21 accurately manages the timing of CAN communication and synchronizes transmission and reception of data. Accordingly, it is possible to suppress a decrease in the accuracy of the process times for transmitting a failure diagnosis request or the like in the failure diagnosis by CAN controller 13. For example, unlike CPU 11, accuracy can be guaranteed in the order of usec.

The buffer reader 22 reads data from the diagnosis buffer 26. The buffer reader 22 reads data from the diagnosis buffer 26 when the counter of the timer 21 reaches a predetermined number of counters. The predetermined number of counters is, for example, Nc of "wait times" set in the diagnosis buffer 26. Nc is an integer representing a predetermined number of counters.

For example, the buffer reader 22 reads out a plurality of data frames in FIG. 2, and acquires data corresponding to one row of the tables in FIG. 2 by one read up to N−1 times. At the Nth time, the buffer reader 22 acquires NULL. The diagnosis buffer 26 is, for example, a ring buffer, and the buffer reader 22 may return to the first time after the Nth read.

The buffer decoder 23 interprets "command" or "expected value of response" as the current processing based on the contents (data of one row) of the read diagnosis buffer 26.

When the "command" is read out this time, the buffer decoder 23 transmits, to the diagnosis transfer 24, data related to a failure diagnosis request for the diagnosis target ECU 3.

When the "expected value" is read out this time, the buffer decoder 23 transmits data of the expected value expected as a response to the diagnosis receiver 25.

Diagnosis transfer 24 is a transmitter for transmitting message data between CAN controller 13 and CAN bus 2. The diagnosis transfer 24 issues a fault diagnostic (Diagnostic) send command to CAN bus 2. When a "command" is read out by the buffer decoder 23, the diagnosis transfer 24 issues a transmission command adapted to CAN communication protocol to CAN bus 2 so as to transmit, to the diagnosis target ECU 3, data related to a failure diagnosis request for the received diagnosis target ECU 3.

Diagnosis receiver 25 is a receiver for receiving message data between CAN controller 13 and CAN bus 2. The diagnosis receiver 25 receives a fault diagnosis response command from CAN bus 2, performs a diagnosis based on the response received from the diagnosis target ECU 3, and transmits the result of the diagnosis to CPU 11. When the "expected value" is read out by the buffer decoder 23, the diagnosis receiver 25 compares whether the response received from the diagnosis target ECU 3 matches the received expected value, and acquires the comparison result as a "diagnosis result (OK or NG)". When the received reply does not match the expected value, the diagnosis receiver 25 acquires ID of the target ECU 3 to be diagnosed as "error information (ID of mismatch)". Diagnostics and error messages are sent to CPU 11 by the diagnosis receiver 25.

When NULL value is obtained as a result of the Nth read operation performed by the buffer reader 22, the diagnosis receiver 25 may transmit the completion information indicating that NULL value has been received to CPU 11. The completion information is data indicating the end of reading of the data frame. The completion information may be information (for example, a different ID) different from the information transmitted to CPU 11 in the buffer reader 22 from the first read to N−1 read. The data transmitted to CPU 11 from the first read to N−1 read may include the remaining number of processes up to the Nth read. Alternatively, a predetermined ID may be transmitted and CPU 11 may be configured to recognize, for example, "the remaining three processes when this ID arrives".

Vehicle ECU 1 Processing

Next, an exemplary process of the vehicle ECU 1 will be described referring to FIG. 3. FIG. 3 is a sequence diagram illustrating an example of a diagnosis process of a vehicle control device. The process illustrated in FIG. 3 is executed, for example, at predetermined diagnostic timings during the operation of the vehicle ECU 1.

As illustrated in FIG. 3, in the vehicle ECU 1, CPU 11 transmits, in S11, an instruction to execute fault diagnostics to CAN controller 13.

In S12, the sequencer 20 of CAN controller 13 counts the wait times by the timer 21. In S13, the sequencer 20 reads the diagnostic buffer by the buffer reader 22. In S14, the sequencer 20 reads "command" by the buffer decoder 23, and transmits, by the diagnosis transfer 24, data related to a failure diagnosis request to the diagnosis target ECU 3.

The diagnosis target ECU 3 transmits, in S15, the reply data in response to the data related to the received failure diagnosis request.

In S16, the sequencer 20 reads the diagnostic buffer by the buffer reader 22. In S17, the sequencer 20 reads out the "expected value" by the buffer decoder 23, and executes diagnostics based on the expected value of the reply by the diagnosis receiver 25. In S18, the sequencer 20 transmits a diagnostic result to CPU 11 by the diagnosis receiver 25.

In S19, CPU 11 acquires the diagnostic data transmitted from CAN controller 13. Thereafter, the vehicle ECU 1 ends the process of FIG. 3. CPU 11 of the vehicle ECU 1 may repeatedly execute the process of FIG. 3 until it receives the completion message indicating that NULL has been received from the diagnosis receiver 25.

As described above, in the vehicle ECU 1, CPU 11 transmits the execution instruction of the failure diagnosis to CAN controller 13, and CAN controller 13 performs the diagnosis based on the reception of the execution instruction and transmits the diagnosis to CPU 11. When CPU 11 transmits an instruction to execute the failure diagnosis, it is possible to obtain the diagnosis without performing the diagnosis process. As a result, it is possible to reduce the processing loads and the usage memories of CPU 11 and to reduce the burden on CPU associated with the failure diagnosis, as compared with cases where CPU 11 themselves perform the diagnosis processing.

In other words, in CAN controller 13 of the microcomputer 10, CAN controller 13 itself can voluntarily perform "diagnosis" such as issuance of a request, reception of a reply, and determination without software. Since the sequencer 20 performs the diagnosis, CPU 11 does not need to perform the process. As described above, the regular processing such as the diagnosis is actively performed by the sequencer 20 in hardware, so that CPU 11 resources can be used for a valuable application such as an application.

In the above embodiment, the diagnosis buffer 26 stores data related to the request and data related to the response as a plurality of data frames, respectively. Then, the diagnosis buffer 26 selects whether to transmit a failure diagnosis request to the diagnosis target ECU 3 or to perform diagnosis based on the response from the diagnosis target ECU 3, based on the data included in the data frame that the sequencer 20 reads from the diagnosis buffer 26. As a result, the sequencer 20 can automatically switch the operation of the sequencer by sequentially reading the data frames. By storing the data in the diagnosis buffer 26 of CAN controller 13, the number of codes flushed to the flash memory 12 can be reduced, and the use of RAM at the time of calculation of CPU 11 can also be reduced.

In the above-described embodiment, when all the data included in the data frame is read from the diagnosis buffer 26, the sequencer 20 transmits, to CPU 11, completion data indicating that the reading is completed. As a result, CPU 11 can recognize that the series of diagnoses included in the data frame has been completed.

Although the embodiment of the disclosure has been described above, the disclosure is not limited to the embodiment above.

In the above embodiment, the diagnosis buffer 26 stores data related to the request and data related to the response as a plurality of data frames, respectively, but the use of the data frames is not essential. The data relating to the request and the data relating to the response may be data for performing a single fault diagnosis.

In the above-described embodiment, when all the data included in the data frame is read from the diagnosis buffer 26, the sequencer 20 transmits, to CPU 11, completion data indicating that the reading is completed, but the disclosure is not limited to the example. In this case, the last Nth data in FIG. 2 may not be "NULL".

In the above-described embodiment, all of the failure diagnosis is performed by the sequencer 20, but the present disclosure is not limited to this example. For example, CPU 11 may share some diagnostics that may have low temporal accuracy. For example, if CAN controller 13 requires more diagnostics than can be performed, CPU 11 may share the diagnostics that could not be performed by CAN controller 13.

In addition, when it is suspected that an error occurs in diagnosis target ECU 3 as the diagnosis result of CAN controller 13, a diagnosis code for more detailed diagnosis of the details of the error (for example, determination of whether the error is a sky fault or a ground fault, etc.) may be prepared in the flash memory 12 and executed by CPU 11.

What is claimed is:

1. A vehicle control device comprising a central processing unit and a controller area network controller, wherein
   the central processing unit is configured to transmit an execution instruction for failure diagnosis to the controller area network controller,
   the controller area network controller includes a storage unit configured to store data on a request for the failure diagnosis of a diagnosis target and data on a response from the diagnosis target, and a sequencer configured to operate in response to the execution instruction, and
   the sequencer is configured to read the data from the storage unit in response to reception of the execution instruction, transmit a request for the failure diagnosis to the diagnosis target, receive a response transmitted from the diagnosis target in response to the request for the failure diagnosis, execute diagnosis based on the received response, and transmit a result of the diagnosis to the central processing unit.

2. The vehicle control device according to claim 1, wherein:
   the storage unit is configured to store the data on the request and the data on the response as a plurality of data frames; and the sequencer is configured to, based on the data included in the data frames read from the storage unit, select whether to transmit the request for the failure diagnosis to the diagnosis target or to execute the diagnosis based on the response.

3. The vehicle control device according to claim 2, wherein the sequencer is configured to, when all the data included in the data frames has been read from the storage unit, transmit data indicating completion of reading to the central processing unit.

\* \* \* \* \*